United States Patent
Backlund et al.

(10) Patent No.: US 8,599,786 B2
(45) Date of Patent: Dec. 3, 2013

(54) METHOD AND SYSTEM FOR BASE STATION CHANGE OF PACKET SWITCHED COMMUNICATIONS IN A MOBILE COMMUNICATIONS SYSTEM

(75) Inventors: Ingemar Backlund, Sollentua (SE); John Walter Diachina, Garner, NC (US); Gunnar Mildh, Kista (SE); Lars Tedenvall, Hassleholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1765 days.

(21) Appl. No.: 10/597,351

(22) PCT Filed: Jan. 28, 2005

(86) PCT No.: PCT/SE2005/000108
§ 371 (c)(1),
(2), (4) Date: Jul. 21, 2006

(87) PCT Pub. No.: WO2005/074308
PCT Pub. Date: Aug. 11, 2005

(65) Prior Publication Data
US 2008/0240035 A1    Oct. 2, 2008

(30) Foreign Application Priority Data
Jan. 28, 2004  (SE) ...................................... 0400163

(51) Int. Cl.
*H04Q 7/00*        (2006.01)
*H04Q 7/20*        (2006.01)
(52) U.S. Cl.
USPC ........... 370/331; 370/332; 455/436; 455/438; 455/439; 455/440; 455/442

(58) Field of Classification Search
USPC ......... 370/310, 394, 389, 328–338, 236, 392; 455/422.1–444, 436–442
See application file for complete search history.

(56) References Cited

U.S. PATENT DOCUMENTS

| | | | |
|---|---|---|---|
| 5,978,679 A * | 11/1999 | Agre | 455/442 |
| 6,438,117 B1 * | 8/2002 | Grilli et al. | 370/331 |
| 6,594,489 B2 * | 7/2003 | Holcman | 455/432.1 |
| 6,661,782 B1 * | 12/2003 | Mustajarvi et al. | 370/331 |

(Continued)

FOREIGN PATENT DOCUMENTS

| | | |
|---|---|---|
| EP | 0891114 | 1/1999 |
| EP | 1 318 691 A2 | 6/2003 |

(Continued)

OTHER PUBLICATIONS

ETSI TS 144 065 V5.1.0 (Sep. 2003); Digital cellular telecommunications system (Phase 2+); Mobile Station (MS)—Serving GPRS Support Node (SGSN); Subnetwork Dependent Convergence Protocol (SNDCP) (3GPP TS 44.065 version 5.1.0 Release 5).

(Continued)

*Primary Examiner* — Asad M Nawaz
*Assistant Examiner* — Wutchung Chu

(57) ABSTRACT

The present invention relates to change of base stations transferring packet switched communications between a mobile station and a support node. The base station change is of lossless type allowing lossless base station change of packet switched communications in unacknowledged mode between the mobile station and the support node.

8 Claims, 4 Drawing Sheets

(56) References Cited

U.S. PATENT DOCUMENTS

| | | | |
|---|---|---|---|
| 6,704,581 B1 * | 3/2004 | Park et al. | 455/553.1 |
| 6,728,208 B1 * | 4/2004 | Puuskari | 370/230.1 |
| 6,804,519 B1 * | 10/2004 | Czaja et al. | 455/442 |
| 6,845,095 B2 * | 1/2005 | Krishnarajah et al. | 370/349 |
| 6,928,304 B2 * | 8/2005 | Wigell et al. | 455/561 |
| 7,167,475 B2 * | 1/2007 | Tourunen et al. | 370/394 |
| 7,251,490 B2 * | 7/2007 | Rimoni | 455/436 |
| 7,266,105 B2 * | 9/2007 | Wu | 370/338 |
| 7,318,187 B2 * | 1/2008 | Vayanos et al. | 714/776 |
| 7,356,146 B2 * | 4/2008 | Yi et al. | 380/262 |
| 2001/0043579 A1 | 11/2001 | Tourunen | |
| 2002/0080819 A1 * | 6/2002 | Tsao | 370/469 |
| 2002/0191556 A1 * | 12/2002 | Krishnarajah et al. | 370/329 |
| 2003/0153309 A1 * | 8/2003 | Bjelland et al. | 455/432 |
| 2003/0157927 A1 | 8/2003 | Yi et al. | |
| 2003/0169725 A1 * | 9/2003 | Ahmavaara et al. | 370/352 |
| 2003/0190915 A1 * | 10/2003 | Rinne et al. | 455/436 |
| 2003/0210676 A1 * | 11/2003 | Wu | 370/350 |
| 2005/0037758 A1 * | 2/2005 | Rimoni | 455/436 |
| 2005/0147042 A1 * | 7/2005 | Purnadi et al. | 370/236 |
| 2006/0062167 A1 * | 3/2006 | Golitschek et al. | 370/293 |
| 2006/0165027 A1 * | 7/2006 | Heden | 370/328 |
| 2007/0183451 A1 * | 8/2007 | Lohr et al. | 370/473 |
| 2007/0249390 A1 * | 10/2007 | Purkayastha et al. | 455/552.1 |
| 2009/0028111 A1 * | 1/2009 | Chao et al. | 370/331 |

FOREIGN PATENT DOCUMENTS

| | | |
|---|---|---|
| WO | WO 00/74341 A1 | 12/2000 |
| WO | WO 00/79808 A2 | 12/2000 |
| WO | WO 0217651 | 2/2002 |
| WO | WO 02/085048 A1 | 10/2002 |
| WO | WO 03107693 | 12/2003 |

OTHER PUBLICATIONS

ETSI TS 125 323 v6.0.0 Universal Mobile Telecommunications Systems (UMTS); Packet data Convergence Protocol (PDCP) Specification. Dec. 2003.

ETSI TS 129 060 5.8.0 Digital Cellular Telecommunications System (Phase 2+); Universal Mobile Telecommunications Systems (UMTS); General Packet Radio Service (GPRS); GPRS Tunnelling Protocol (GTP) Across the Gn and Gp Interface. Dec. 2003.

ETSI TS 129 060 5.6.0 Digital Cellular Telecommunications System (Phase 2+); Universal Mobile Telecommunications Systems (UMTS); General Packet Radio Service (GPRS); Service Description Stage 2. Jun. 2003.

Digtal cellular telecommunications system (Phase 2+); Universal Mobile Telecommunications System (UMTS): Mobile radio interface signalling layer 3: Genera: Aspects (3GPP TS 24.007 v5.1.0 Release 5). ETSI TS 124 007 v5.1.0 (Sep. 2009).

3rd Partnership Project; Technical Specification Group Services and System Aspects: General Packet Radio Service (GPRS); Service description: Stage 2 (Release 6) (3GPP TS 23.060 V6.2.0; published in Sep. 2003).

* cited by examiner

METHOD AND SYSTEM FOR BASE STATION CHANGE OF PACKET SWITCHED COMMUNICATIONS IN A MOBILE COMMUNICATIONS SYSTEM

TECHNICAL FIELD OF THE INVENTION

The present invention relates to communications. More especially it relates to packet data communications over radio links and change of base station. Particularly it relates to base station handover of packet switched communications in GPRS (General Packet Radio System) and UMTS (Universal Mobile Telecommunications System) communications.

BACKGROUND AND DESCRIPTION OF RELATED ART

Packet Radio Services offers packet switched communications over radio links in e.g. GPRS and UMTS. Data is disassembled and transmitted in packets or Protocol Data Units (PDUs). Upon reception, the PDUs are reassembled.

FIG. 1 illustrates protocol layers for GERAN (GSM-EDGE Radio Access Network) A/Gb mode and will be explained in some detail below. All functions related to transfer of Network layer Protocol Data Units, N-PDUs, shall be carried out in a transparent way by the GPRS network entities.

$3^{rd}$ Generation Partnership Project (3GPP): *Technical Specification Group GERAN, Digital cellular telecommunications system (Phase 2+); General Packet Radio Service (GPRS); Overall description of the GPRS radio interface; Stage 2 (Release 4), 3GPP TS 43.064 V4.3.0*, France, February 2002, provides the overall description for lower-layer functions of GPRS and EGPRS (Enhanced GPRS) radio interface, Um. In the sequel GPRS refers to both GPRS and EGPRS in not explicitly stated otherwise. An EGPRS mobile/base station is a GPRS compliant mobile/base station with additional capabilities for enhanced radio access protocol features and enhanced modulation and coding schemes. The support of EGPRS is optional for mobile station and network.

$3^{rd}$ Generation Partnership Project (3GPP): *Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4), 3GPP TS 44.060 V4.8.0*, France, September 2002, specifies the procedures used at the radio interface for the General Packet Radio Service, GPRS, Medium Access Control/Radio Link Control, MAC/RLC, layer. The RLC/MAC function supports two modes of operation:
  unacknowledged operation; and
  acknowledged operation.

Section 9.3 describes operation during RLC data block transfer. RLC acknowledged mode, RLC-AM, operation uses retransmission of RLC data blocks to achieve high reliability. RLC unacknowledged mode, RLC-UM, operation does not utilize retransmission of RLC data blocks.

$3^{rd}$ Generation Partnership Project (3GPP): *Technical Specification Group Radio Access Network, Physical Layer Procedures, 3G TS 25.322 v3.5.0*, France, December 2000, specifies three data transfer services of radio link control, RLC:
  transparent data transfer service,
  unacknowledged data transfer service, and
  acknowledged data transfer Service Subsections 4.2.1.1 and 4.2.1.2 describe transparent mode entities and unacknowledged mode entities. One difference of the two modes resides in management of packet overhead. In transparent mode no overhead is added or removed by RLC. In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used.

$3^{rd}$ Generation Partnership Project (3GPP): *Technical Specification Group Core Network; Digital cellular telecommunications system (Phase 2+); Mobile Station (MS)—Serving GPRS Support Node (SGSN); Subnetwork Dependent Convergence Protocol (SNDCP) (Release 5), 3G TS 44.065 v5.1.0*, France, September 2003, provides a description of the Subnetwork Dependent Convergence Protocol, SNDCP, for GPRS. SNDCP entity performs multiplexing of data coming from different sources to be sent using service provided by the LLC (Logical Link Control) layer, $3^{rd}$ Generation Partnership Project (3GPP): *Technical Specification Group Core Network; General Packet Radio Service (GPRS); GPRS Tunnelling Protocol (GTP) across the Gn and Gp interface (Release 5), 3GPP TS 29.060 V5.8.0*, France, December 2003, defines the second version of GTP used on:
  the Gn and Gp interfaces of the GPRS;
  the Iu, Gn and Gp interfaces of the UMTS.

Within GPRS (and UMTS) Gn interface is an interface between
  GPRS Support Nodes (GSNs) within a PLMN and Gp interface is an interface between GPRS Support Nodes (GSNs) of different PLMNs. In UMTS Iu interface is an interface between RNC and Core Network.

A Gb interface is an interface between an SGSN (Serving GPRS Support Node) and a BSC (Base Station Controller). An A interface is an interface between BSC and MSC (Mobile Services Switching Center).

GPRS Tunneling Protocol, GTP, is the protocol between GPRS Support Nodes, GSNs, in the UMTS/GPRS backbone network. GTP allows multi-protocol packets to be tunneled through the UMTS/GPRS Backbone between GSNs and between SGSN (Serving GSN) and UTRAN (Universal Terrestrial Radio Access Network).

$3^{rd}$ Generation Partnership Project (3GPP): *Technical Specification Group Core Network; Mobile Station—Serving GPRS Support Node (MS-SGSN); Logical Link Control (LLC) layer specification; (Release 4), 3GPP TS 44.064 V4.3.0*, France, March 2002, defines the Logical Link Control, LLC, layer protocol to be used for packet data transfer between the Mobile Station, MS, and Serving GPRS Support Node, SGSN. LLC spans from the MS to the SGSN. LLC is intended for use with both acknowledged and unacknowledged data transfer.

LLC supports two modes of operation:
  Unacknowledged peer-to-peer operation, LLC-UM, and
  Acknowledged peer-to-peer operation, LLC-AM.

In unacknowledged operation logical link entity may initiate transmissions to a peer entity without prior establishment of a logical connection with the peer entity. LLC does not guarantee in-order delivery. LLC can detect errors in a received frame, and, depending on whether the frame is sent in protected mode or not, either discard or deliver the erroneous frame. No error recovery procedures are defined at the LLC layer. Higher-layer protocols can be used to provide reliability, if needed. This mode of operation is known as Asynchronous Disconnected Mode, ADM.

With acknowledged operation a balanced data link involves two participating entities, and each entity assumes responsibility for the organization of its data flow and for error recovery procedures associated with the transmissions that it originates. Each entity operates as both a data source and data sink in a balanced link, allowing information to flow in both directions. This mode of operation is known as Asynchronous Balanced Mode, ABM, and provides a reliable service with in-order delivery.

European Patent Application EP1318691 describes a method for informing the SGSN about a mobile station cell-change operation in the GPRS.

International Patent Application WO03032672 discloses a method of optimization of handover procedures in GPRS comprising the old SGSN sending identification response directly to the new SGSN.

International Patent Application WO0079808 claims a method of reducing delay time for a mobile station being handed over from an old SGSN to a new SGSN during a call handling a real-time payload in a GPRS packet switched radio telecommunications network comprising shortening the inter-SGSN Routing Area Update interruption interval and implementing low latency requirements and shaping of packet traffic.

International Patent Application WO02085048 describes a handover procedure for use in a GPRS network, reducing the need for re-sequencing in SGSN. Old SGSN sends a message to GGSN (Gateway GSN) requesting data transmission to stop. Data at old SGSN, for transmission to MS, is transferred to new SGSN and transmission from GGSN is resumed when handover is complete. GGSN then transmits data to new SGSN.

In U.S. Patent Application US20010019544 the GGSN and SGSN are allowed to finish up on-going transactions before moving the context to the new SGSN. The first (old) SGSN is operating as a temporary anchor in response to an inter-SGSN routing area update.

European Patent Application EP1345463 reveals buffering of TCP packets in a mobile node during handover.

FIG. 2 illustrates schematically some network elements involved in packet switched handover. A source SGSN <<source SGSN>> connected to a gateway GSN <<GGSN>> supports data traffic to a mobile station <<MS>> via a source base station subsystem <<source BSS>>. A base station change may be initiated, e.g. as the mobile station moves, towards a base station of a target base station subsystem <<target BSS>> supported by a target SGSN <<target SGSN>>.

In prior art lossy type of packet switched handover is used for services requiring short delay but allowing some data loss at cell change, e.g. speech services. For lossy handover downlink data is typically duplicated by the source SGSN and sent both to the source BSS for further transmission to the mobile station in the current cell, and to the target SGSN <<target SGSN>>.

The target side (BSS/SGSN) can either discard the forwarded data until the MS has indicated its presence in the target cell or, blindly, send the data without information available on whether or not the MS is present in the target cell. In case of blindly sending the data, the mobile station has been ordered to perform the handover and has synchronized towards the target cell, the downlink data flow is already ongoing and the mobile station can immediately start the uplink data flow. No acknowledgement of received data is required, neither in uplink nor in downlink.

According to prior art solutions, data losses will occur, e.g., when data packets sent to source BSS from source SGSN are discarded in source BSS when a mobile station is handed over from source BSS to target BSS. Losses will also occur if e.g. packet data forwarded to MS via the target SGSN and target BSS experiences a delay that is less than the delay associated with the MS processing the handover command and acquiring synchronization.

Lossless type of packet switched handover, PS handover, is used for services that are sensitive to data losses but can accept a certain delay. The typical characteristics of a lossless handover are currently based on acknowledged RLC and LLC protocols and the SNDCP protocol operating in acknowledged mode. During the PS handover the downlink data flow is forwarded from the source SGSN to the target SGSN. The target SGSN buffers the downlink data until the mobile station has indicated its presence in the target cell. The SNDCP layer at both the MS and SGSN assigns N-PDU Send number to each N-PDU sent and maintains N-PDU Receive number for each received N-PDU for any given bi-directional packet service. When a handover is performed of such a service the number of the next expected uplink and downlink N-PDU is exchanged between the MS and the SGSN in handover signaling messages allowing precise knowledge of where packet data transmission should resume after handover.

None of the cited documents above discloses lossless packet switched base station handover or radio cell change in LLC unacknowledged mode, LLC-UM.

SUMMARY OF THE INVENTION

Packet switched base station handover according to the invention is associated with cell change both within GERAN and between GERAN and UTRAN. According to the invention the cell reselection time can be reduced. Also, due to the invention allowing operating, particularly LLC, in unacknowledged mode, link delay can be reduced during an entire data transfer session. This is particularly the case for base station handover in RLC-UM and LLC-UM.

Handover for which data losses may occur is known as lossy handover. For packet data communications with strict delay requirements lossless handover according to prior art is not always feasible due to its imposed additional delay caused by acknowledgements and retransmissions. The delay introduced by particularly LLC protocol layer in acknowledged mode affects higher layer operations, e.g. TCP based services with a resulting throughput deterioration due to TCP congestion control erroneously interpreting the additional delay as channel congestion. Presently the only packet switched handover solution offered for delay sensitive applications, when LLC-AM is excluded, is lossy handover. Lossless packet switched handover can, according to prior art, only be achieved by operating LLC/SNDCP in acknowledged mode, which will increase overhead, add delay and reduce overall throughput.

Consequently, there is a need of reducing data transfer delay and control signaling, without risking packet losses due to packet switched handover.

It is consequently an object of the present invention to reduce data transfer delay without packet losses due to handover.

A further object is to reduce packet switched data transfer overhead without packet losses due to handover.

It is also an object not to require LLC-AM as a means for reducing the risk of data losses at packet switched handover.

Another object is to circumvent throughput reduction due to handover.

Finally, it is an object of the present invention to enhance LLC/SNDCP protocols to provide lossless handover with LLC/SNDCP operating in unacknowledged mode.

These objects are met by a method and system of lossless base station handover for packet switched communications not requiring LLC/SNDCP to operate in acknowledged mode during the complete data transfer session.

DESCRIPTION OF PREFERRED EMBODIMENTS

Figure 1:
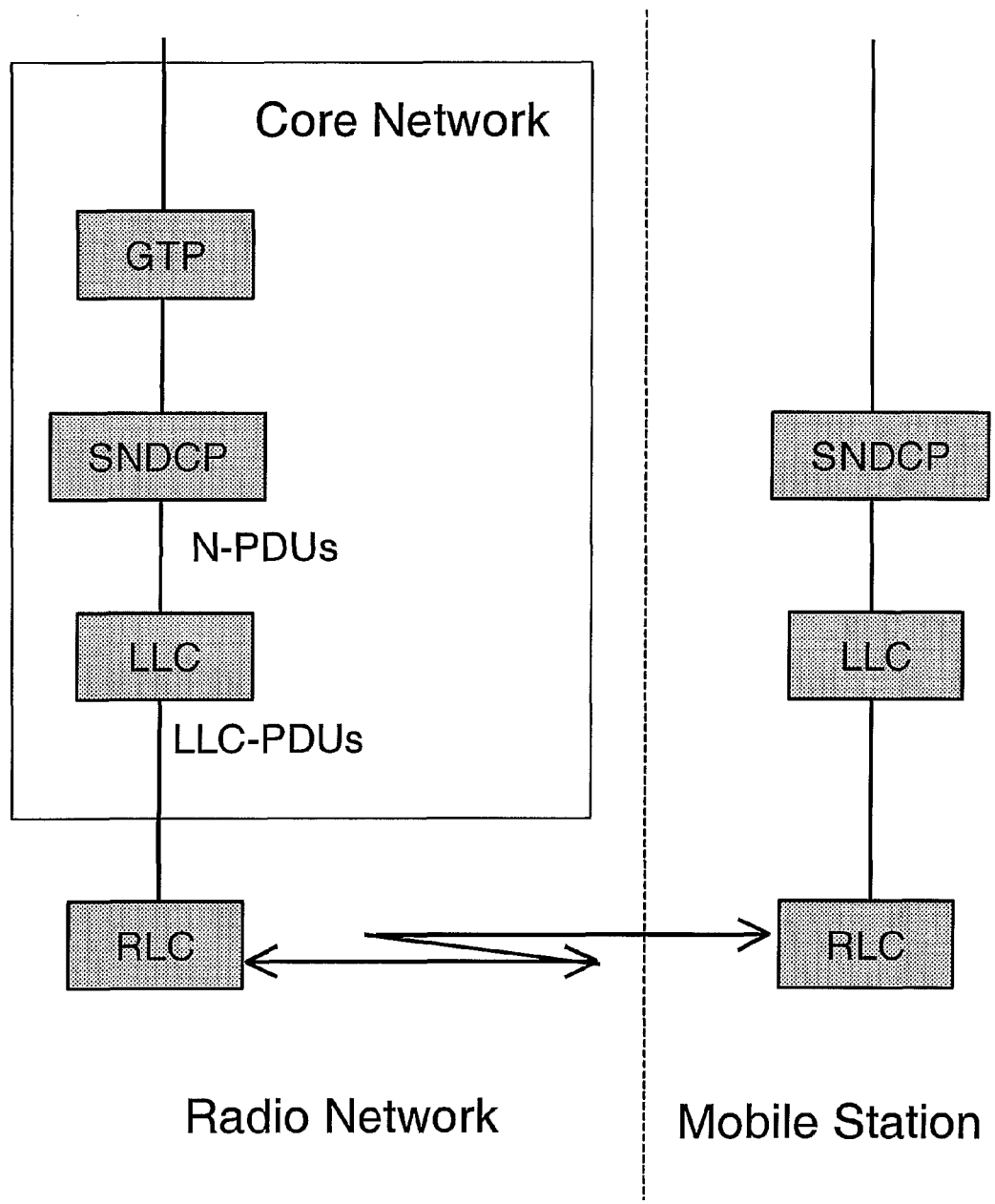
FIG. 1 illustrates protocol layers for GERAN (GSM-EDGE Radio Access Network) A/Gb mode, according to prior art.
Figure 2:
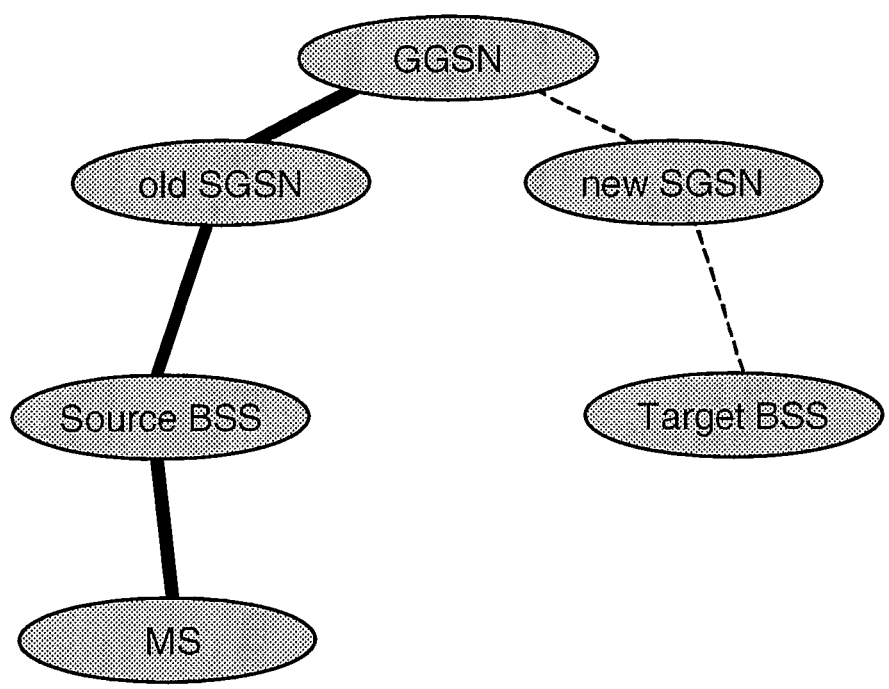
FIG. 2 illustrates schematically some network elements involved in packet switched handover.

To handle handover of packet services that require a minimum of packet loss it is currently possible to operate both the RLC and the LLC/SNDCP protocols in acknowledged mode. However this is not desirable as with these two protocols operating in acknowledged mode a certain amount of delay will be introduced whenever retransmission is determined to be necessary at any of these layers. The delay introduced especially when retransmission occurs at the LLC layer may impact higher layer operation, e.g. for TCP based services where a protocol stack consisting of TCP/IP/SNDCP/LLC/RLC is used, with the net result being a major reduction in throughput temporarily being experienced by the affected packet service. This extra delay will impose a lowered quality of service as perceived by the user. In addition, operating these two protocols in acknowledged mode will result in increased overhead used for control plane functions, and therefore renders less bandwidth available to user plane payload.

Today's streaming services are normally implemented operating RLC in acknowledged mode and LLC/SNDCP in unacknowledged mode, which allows for eliminating the potential for serious delay problems as described above. However, this approach has the problem of not being able to support lossless packet service for the case where MS mobility involves a change of radio cell/base station and SGSN.

Packet switched base station handover according to the invention is associated with radio cell change both within GERAN and between GERAN and UTRAN.

To minimize potential delay and extra overhead as would result if operating the LLC/SNDCP protocols in acknowledged mode, for all packet flows subject to lossless packetswitched handover, PS handover, and to be compliant with the principles used for lossless data transfer in UTRAN, the following embodiments are identified:
  new mode of operation for SNDCP
  management of downlink Status with/without Source BSS assistance, and
  management of uplink status with/without source BSS assistance.

They are preferably combined. The packet loss during handover is minimized without requiring LLC/SNDCP protocols to operate in acknowledged mode during an entire data transfer session. Thereby higher user data rates are achieved during the entire data transfer session.

New Mode of Operation for SNDCP

The SNDCP protocol is modified to support a new mode of operation where it operates with both N-PDU Send and Receive Sequence numbers combined with the LLC protocol operating in unacknowledged mode. This means that the SNDCP protocol entities in the mobile station and in the network shall each maintain a Send and a Receive N-PDU Sequence number and also GTP T-PDU uplink and downlink sequence numbers for each packet flow subject to lossless PS handover. This sequence number information is forwarded from the source SGSN to the target SGSN so that a SNDCP engine started in the target SGSN can maintain sequence number continuity with the SNDCP engine used in the source SGSN. The downlink N-PDU sequence number and the downlink GTP T-PDU numbers are provided along with each N-PDU forwarded from the source SGSN to the target SGSN.

Management of Downlink Status with Source BSS Assistance

The downlink LLC data buffered in the source BSS that has not yet been sent to or acknowledged by the mobile station (at the RLC layer) at the point of time when the source BSS sends the PS handover command message to the MS can be deleted and a status message sent back to the source SGSN telling it how many LLC PDUs were deleted for each packet flow subject to lossless PS handover.

Alternatively, the status message sent from the source BSS to the source SGSN could provide parts of the deleted LLC PDUs, e.g. the LLC header, or even the complete LLC PDUs. This means that SN-UNITDATA PDUs previously sent down to LLC at the source SGSN and relayed to the source BSS as segmented LLC PDUs will either be explicitly returned to the source SGSN or referenced in such a way to allow the source SGSN to determine which N-PDUs have not been sent to the MS, i.e. which whole N-PDUs have been acknowledged by the MS on RLC layer.

The Send N-PDU sequence numbers determined by the source SGSN are then forwarded in a message to the target SGSN. Upon MS arrival in the target cell the target SGSN can start transmitting the next downlink N-PDU expected by the MS for each packet flow subject to lossless PS handover. The MS can detect duplications of downlink N-PDUs since the sequence number used at the target SGSN is based on the sequence number used by source SGSN and it is included in the header of each N-PDU sent from the target SGSN.

For this embodiment it is required that the source SGSN supports N-PDU buffering if downlink N-PDUs are to be forwarded to the target SGSN in their correct order or the source BSS sends a status message that does not contain complete LLC PDUs. If the target SGSN can accept N-PDUs that are out of order and the status message sent by the source BSS contains complete LLC PDUs then the source SGSN need not support N-PDU buffering.

Management of Downlink Status without Source BSS Assistance

In this embodiment the source SGSN can only estimate the Send N-PDU sequence numbers based on the delay attribute (with sufficient margin added) associated with each packet flow subject to lossless PS handover and forward these estimates to the target SGSN.

Source BSS buffers has downlink LLC data not yet sent to or acknowledged by the mobile station (at the RLC layer) at the point of time when the source BSS sends the PS handover command message to the MS. The source BSS sends the PS handover command message to the MS. Thereafter it sends a status message back to the source SGSN only indicating that the MS has been sent a PS handover command message (i.e. no downlink status is included in the message).

If upon arrival in the target cell, the MS does not send the network a message that provides downlink sequence number status for all packet flows subject to lossless PS handover, the target SGSN has no choice but to use the estimated Send N-PDU sequence numbers provided by the source SGSN. This may result in the target SGSN sending multiple downlink N-PDUs already received by the MS. However, the MS can once again detect duplications of downlink N-PDUs since the sequence number is included in the header of each SN-UNITDATA PDU used to transit each N-PDU.

If upon arrival in the target cell, the MS sends the network a message that provides downlink sequence number status for all packet flows subject to lossless PS handover, the target SGSN will have exact knowledge as to which downlink N-PDU to begin sending for each packet flow. The target SGSN deletes all downlink N-PDUs forwarded from the source SGSN that are implicitly acknowledged by the downlink sequence number status provided by the MS upon arrival in the target cell.

The embodiment requires that the source SGSN supports N-PDU buffering since a minimum set of downlink N-PDUs sent down to the source BSS must be buffered for each packet flow subject to lossless PS handover. The quantity of N-PDUs buffered for a given packet flow can be determined by, e.g., the delay attribute associated with that packet flow.

Management of Uplink Status with Source BSS Assistance

When the source BSS receives the PS handover command message from the source SGSN it will at a point of time stop acknowledging RLC packets in the uplink. When this occurs it will send a status message to the source SGSN indicating that no more uplink LLC PDUs will be forwarded to it. The source SGSN can then determine the Receive N-PDU sequence numbers for all uplink packet flows subject to lossless PS handover and include them in a message to the target SGSN. After notifying the source SGSN, the source BSS will send the PS handover command message to the MS.

The PS handover command message may contain an up to date RLC ACK/NACK report allowing the MS to determine which N-PDUs have been completely received by the network. The MS will start uplink transmission upon arrival in the target cell from the next uplink N-PDU that was not acknowledged by lower layers in the old cell. This N-PDU should always correspond to the next uplink N-PDU expected by the target SGSN for each packet flow subject to lossless PS handover.

Alternatively, the PS handover command message may not include an RLC ACK/NACK report or any other indication of uplink status that the MS could use to determine the Send N-PDU sequence number for the packet flows subject to lossless PS handover. The MS will therefore start uplink transmission upon arrival in the target cell from what is estimated next uplink N-PDU that was not acknowledged by lower layers in the old (source) cell. In this case the first N-PDU sent by the MS in the new cell may not correspond to the next uplink N-PDU expected by the target SGSN. However, since the N-PDU sequence number is included in the header of each SN-UNITDATA PDU used to transmit each N-PDU the target SGSN will be able to remove any duplication.

For both alternatives the source BSS is considered to have provided assistance to the source SGSN in that a status message is sent. The message indicates that the source BSS has stopped acknowledging RLC packets in the uplink and that no more uplink LLC PDUs will be forwarded to it.

Management of Uplink Status without Source BSS Assistance

The PS handover command message may be sent from the source SGSN to the source BSS and include the expected Receive N-PDU sequence Number that the MS should start transmission with in the target cell for each uplink packet flow subject to lossless handover. This sequence number information is provided by the source SGSN without conferring with the source BSS as to whether or not it has stopped acknowledging RLC data in the uplink. As such, additional uplink LLC PDUs may be acknowledged by the source BSS prior to the PS handover command message being sent to the MS and may therefore result in a conflict with the Send N-PDU sequence number as viewed by the MS. In this case the MS must always accept the uplink sequence number information provided in the PS handover command message over the uplink sequence number information derived from local RLC operation. This means that the MS must always buffer some uplink N-PDUs that have already been confirmed according to RLC. The quantity of these N-PDUs that need to be buffered is expected to be small.

According to the invention a sequence tracking mode, STM, is defined for SNDCP. In STM, the SNDCP entities in the SGSN and in the MS shall always keep track of the uplink and downlink N-PDU sequence numbers corresponding to SNDCP in LLC-AM. Further, in STM uplink and downlink G-PDU sequence numbers associated with uplink and downlink N-PDUs are recorded corresponding to SNDCP in LLC-AM. Also, in STM SNDCP entities in SGSN and in MS shall make use of SN-UNITDATA PDUs corresponding to SNDCP in LLC-UM and SNDCP shall maintain sequence number continuity when PS handover occurs across SGSN.

An additional case is where the PS handover command sent to the MS does not include any Receive N-PDU numbers for any of the uplink packet flows subject to lossless PS handover. In this case the MS will use its local knowledge of uplink status which may lead to a duplicated uplink N-PDU being sent by the MS in new (target) cell. Since this duplication will be deleted by the target SGSN, since N-PDU sequence number continuity is supported across SGSNs, it will not be a problem.

Figure 3:
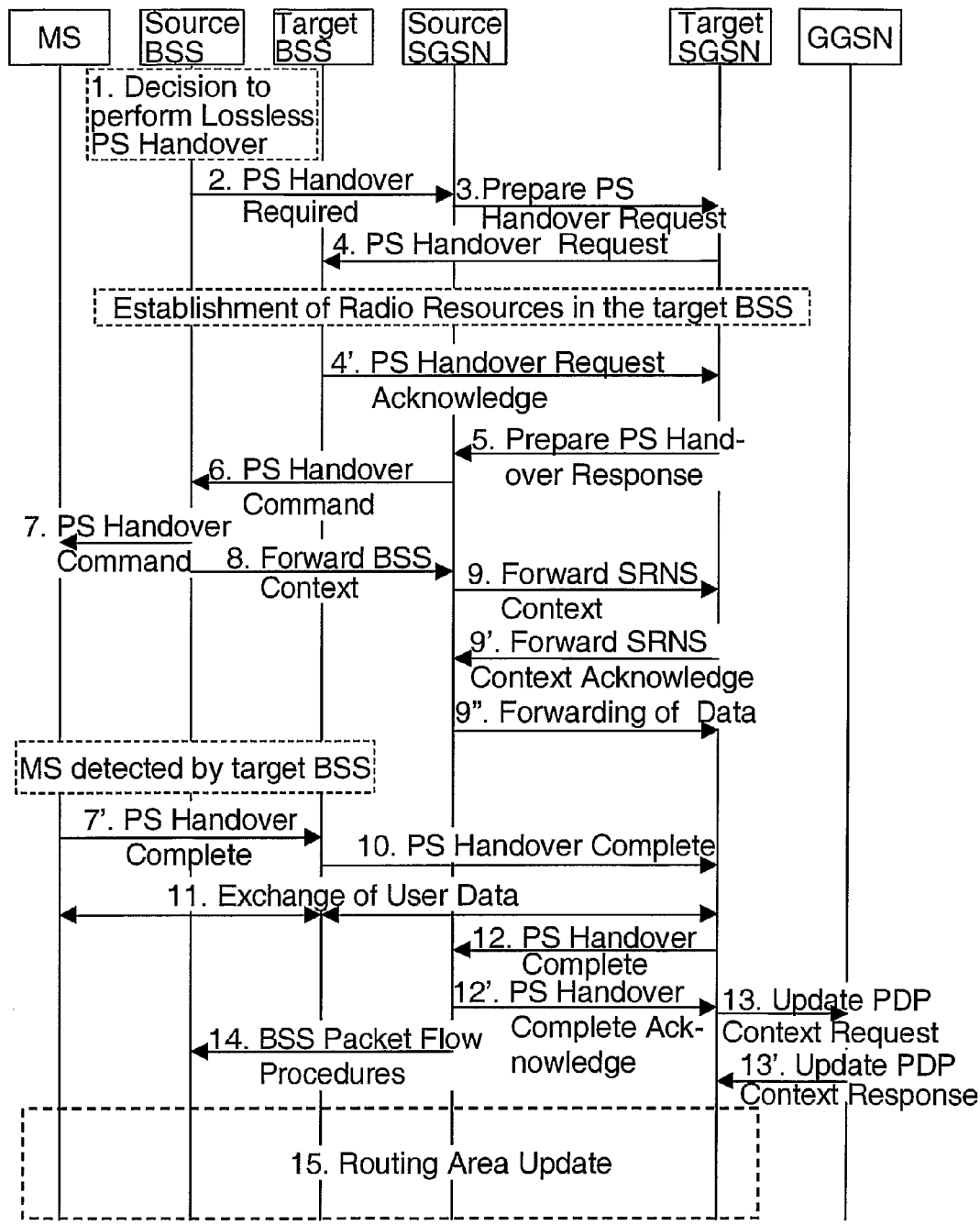
FIG. 3 illustrates an outline of a signaling diagram associated with an example PS handover according to a mode of the invention.

FIG. 3 illustrates an outline of a signaling diagram associated with an example PS handover according to a mode of the invention. In the example LLC operates in unacknowledged mode LLC-UM, even if the invention is applicable also in acknowledged mode, LLC-AM.

The signaling of FIG. 3 is initiated by an MS having one or more ongoing packet flows subject to lossless PS handover when the source BSS determines that a PS handover is required <<1>>. RLC is operating in acknowledged mode, LLC is operating in unacknowledged mode and SNDCP is operating in sequence tracking mode, STM. Thereby N-PDU sequence numbering is managed as if LLC were operating in acknowledged mode. Therefore SNDCP entities in MS and network has to manage two sequence parameters for each packet flow subject to lossless PS handover, the Send N-PDU and the Receive N-PDU sequence numbers.

In STM SNDCP shall use SN-UNITDATA PDUs as with LLC-UM. For each packet flow subject to lossless PS handover the source SGSN buffers a set of downlink N-PDUs that reflects the delay attribute associated with that packet flow. As a non-exclusive example the N-PDUs received from the GGSN during the running latest 500 ms are buffered.

The source BSS sends a PS Handover Required message <<2>> to the source SGSN.

The source SGSN sends a Prepare PS Handover Request message to the target SGSN <<3>>.

The target SGSN sends a PS Handover Request message <<4>> to the target BSS. The target BSS pre-allocates radio resources, if available, to the requested flows and sends a PS Handover Request Acknowledge message <<4'>> back to the target SGSN.

The target SGSN sends a Prepare PS Handover Response message to the source SGSN <<5>>. This message indicates that the SGSN is now ready to receive downlink data forwarded from the source SGSN. When source SGSN receives the Prepare PS Handover Response message <<5>> it
  stops sending downlink data to the source BSS,
  sends the PS Handover Command message <<6>> to the source BSS containing among other things the N-PDU Receive Sequence number of the next expected uplink N-PDU to be received for each packet flow subject to lossless PS handover,
  starts forwarding to the target SGSN all buffered downlink N-PDUs received from the GGSN prior to the arrival of the Prepare PS Handover Response message from the target SGSN, and
  starts forwarding to the target SGSN downlink N-PDUs received from the GGSN after the arrival of the Prepare PS Handover Response message from the target SGSN <<9>>.

Each downlink N-PDU forwarded to the target SGSN <<9>> contains an associated Send N-PDU sequence number and a GTP sequence number. The target SGSN starts buffering of the forwarded downlink N-PDUs until the MS indicates its presence <<7>> in the target cell by sending a PS Handover Complete message to the target SGSN <<7>>, <<10>>.

When the source BSS receives the PS Handover Command <<6>> it
  immediately stops reception and acknowledgement of data in the uplink;
  stops transmission of downlink data towards the MS but may terminate transmission at an LLC PDU boundary without waiting for an acknowledgement;
  sends a Forward BSS Context message to the source SGSN, the message not including information on which buffered downlink LLC-PDUs has been discarded;
  sends a PS Handover Command <<7>> to the MS ordering the MS to a new target cell; the message including Receive N-PDU (uplink) sequence number of the next expected N-PDU to be received as viewed by the source SGSN for each packet flow subject to lossless PS handover;

When the MS has reconfigured itself and acquired synchronization in the new cell, it sends a PS Handover Complete message to the target BSS <<7'>>. This message includes the sequence number of the next expected downlink N-PDU to be received (as viewed by MS) for each downlink packet flow subject to lossless PS handover.

The source BSS then sends a Forward BSS Context message <<8>> to the source SGSN indicating that the BSS has ordered the MS to the new cell. The message comprises no send buffer status information that the source SGSN could make use of for determining the precise status of transmitted downlink N-PDUs before starting forwarding data to the target SGSN.

Upon receiving the Forward BSS Context message <<8>>, the source SGSN determines the following values for each packet flow subject to lossless PS handover and forwards this information to the target SGSN in the Forward SRNS Context message <<9>>:
  Downlink N-PDU Send sequence number for the next downlink N-PDU to be sent to the MS,
  Downlink GTP-U sequence number for the next downlink GTP-U T-PDU to be relayed to the target SGSN,
  Uplink N-PDU Receive sequence number for the next uplink N-PDU to be received from the MS, and
  Uplink GTP-U sequence number for the next uplink GTP-U T-PDU to be sent from the target SGSN to the GGSN.

Prior to receiving the Prepare PS Handover Response message <<5>> the source SGSN was buffering downlink N-PDUs according to the delay attributes of the packet flows subject to lossless PS handover. Since the Forward BSS Context message <<8>> received from the source BSS does not include downlink status information, the source SGSN selects values for the two downlink sequence numbers listed above that reflect the oldest buffered downlink N-PDU for each of the packet flows subject to lossless PS handover. I.e. a worst case scenario is anticipated and corresponding values selected.

Upon receiving the Forward SRNS Context message, the target SGSN sends a Forward SRNS Context Acknowledge message <<9'>> back to the source SGSN.

Thereafter the target BSS sends a PS Handover Complete message <<10>> to target SGSN. The PS Handover Complete message <<10>> includes the sequence number of the next expected downlink N-PDU to be received (as viewed by MS) for each packet flow subject to lossless PS handover.

The target SGSN can now start sending the buffered downlink data starting with the next downlink N-PDU expected by the MS for each packet flow subject to lossless PS handover.

The downlink sequence number status information provided in the PS Handover Complete message <<12>> allows the target SGSN to:
  delete all downlink N-PDUs forwarded from the source SGSN that are implicitly acknowledged by the downlink sequence number status information, and
  ignore downlink sequence number status information provided by the source SGSN in the Forward SRNS Context message <<9>>.

The target SGSN sends a PS Handover Complete message <<12>> to the source SGSN, which acknowledges the completion of the handover procedure by responding with a PS Handover Complete Acknowledge message <<12'>> back to target SGSN. Target SGSN sends an Update PDP Context Request to the GGSN <<13>>. The GGSN updates its PDP context fields and return an Update PDP Context Response message <<13'>>. SGSN initiates Packet Flow Procedures to release resources in the source BSS <<14>>. Finally, MS and target SGSN perform routing area update procedure <<15>>.

The example signaling described above in relation to figure illustrates a method and system where source SGSN provides the MS with the sequence number of the next expected uplink N-PDU to be received in the PS Handover Command <<6>>, <<7>>. (Management of uplink status is provided without information processing of source BSS.)

MS preferably provides the network with the sequence number of the next expected downlink N-PDU to be received in the PS Handover Complete message <<7'>>, <<10>>. (Management of downlink status is provided without information processing of source BSS).

SNDCP entities in the source SGSN preferably support some buffering of downlink N-PDUs. The source SGSN then buffers an amount of N-PDUs corresponding to the delay attribute of the associated packet flow. Upon completion of the PS handover preparation phase all such buffered N-PDUs can be forwarded to the target SGSN to ensure all forwarded N-PDUs arrive in correct order. Downlink N-PDUs received from the GGSN after PS handover preparation is completed will be sent to the target SGSN after the buffered downlink N-PDUs are forwarded. Upon MS arrival to the new cell, the target SGSN discovers the downlink status of the packet flows, e.g. via information provided in the PS Handover Complete message <<10>>, begins transmitting the appropriate downlink N-PDU for each packet flow subject to lossless PS handover and deletes all implicitly confirmed downlink N-PDUs received from the source SGSN.

In SNDCP STM, SNDCP entities in the target SGSN will be required to support some buffering of downlink N-PDUs. This is necessary as lossless operation requires that the target SGSN be informed of the presence of the MS in the new cell before it can begin downlink transmission of packet data.

The source BSS also supports buffering which allows it the option of attempting to empty downlink buffers upon receiving a PS Handover Command <<6>> from the source SGSN.

In SNDCP STM, SNDCP entities in MS will be required to buffer the uplink N-PDUs beyond the point where their associated RLC/MAC entities acknowledges the complete transmission of any given LLC PDU. This is necessary for the example signaling where management of uplink status is provided without information processing of source BSS. This buffering allows source BSS the option of continued reception of uplink data when attempting to empty downlink buffers upon reception of a PS Handover Command <<6≤> from the source SGSN.

The example described in relation to FIG. 3 is just an example. It illustrates, e.g., source SGSN and target SGSN as separate entities (inter SGSN PS handover). However, the invention also covers intra SGSN PS handover between base stations. Also, in FIG. 3 signaling for one single radio access technology, RAT, is illustrated. Though, the same principles are valid also for inter RAT PS handover, such as for PS handover between base stations of GERAN and UTRAN respectively.

Figure 4:
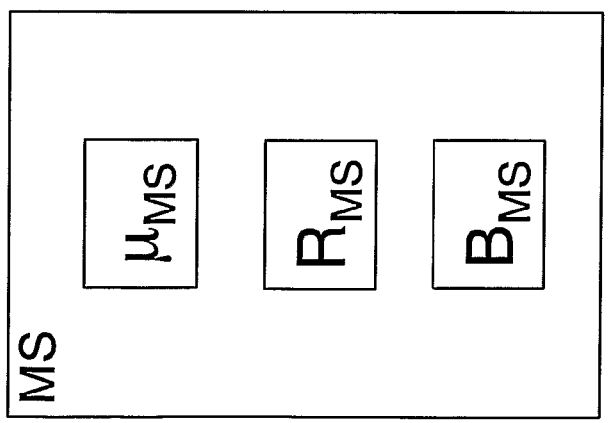
FIG. 4 illustrates a simplified block diagram of a mobile station according to the invention.

FIG. 4 illustrates a simplified block diagram of a mobile station according to the invention. The mobile station comprises processing means $<<\mu_{MS}>>$ operating according to one or more protocols for communicating protocol data units as described above. Receive means $<<R_{MS}>>$ receives information from the communications network to which the mobile station is connected. The receive means are connected to the processing means $<<\mu_{MS}>>$ and receives, e.g., information from the communications network on next expected uplink protocol data unit at handover. Buffer means $<<B_{MS}>>$ buffers uplink protocol data units, N-PDUs, as described above.

Figure 5:
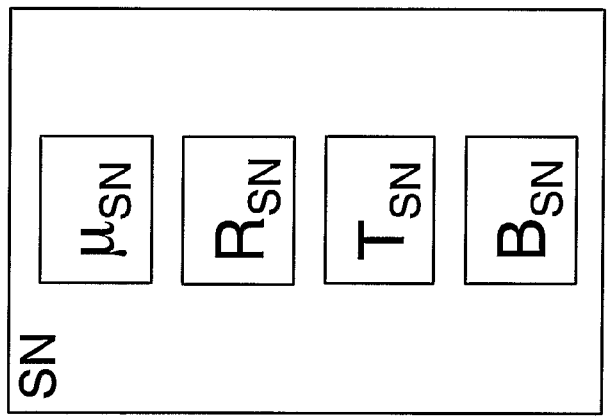
FIG. 5 illustrates a simplified block diagram of a support node according to the Invention.

FIG. 5 displays schematically a block diagram of a support node, such as a Serving GPRS Support Node, SGSN, according to the invention. The support node comprises processing means $<<\mu_{SN}>>$ operating according to one or more protocols for communicating packet switched data as described above. Receive means $<<R_{SN}>>$ receives protocol data units from one or more respective mobile stations on next expected downlink protocol data unit, N-PDU. Transmit means $<<T_{SN}>>$ transmits protocol data units to the one or more mobile stations which are communicating packet switched data over the SGSN. Buffer means $<<B_{SN}>>$ buffers downlink N-PDUs.

Figure 6:
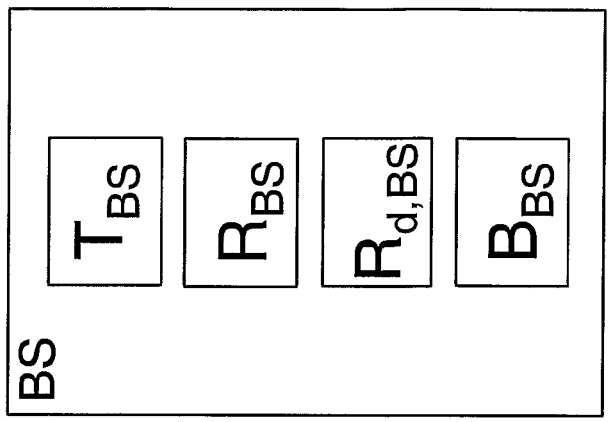
FIG. 6 illustrates a simplified block diagram of a base station entity according to the invention.

FIG. 6 depicts a schematic block diagram of a base station entity according to the invention. The base station entity comprises receive means $<<R_{BS}>>$, transmit means $<<T_{BS}>>$ and buffer means $<<B_{BS}>>$. The receive means $<<R_{BS}>>$ receiving one or more commands of base station change as decided by network to which the base station entity is connected. Also, receive means receives $<<R_{d,BS}>>$ that is not necessarily identical to receive means $<<R_{BS}>>$, receives uplink data from one or more mobile stations communicating packet switched data via the base station entity. The transmit means $<<T_{BS}>>$ transmits protocol data units to one or more mobile stations communicating packet switched data via the base station entity.

A person skilled in the art readily understands that the properties of an SGSN, a GGSN, a BSS, a base station or an MS are general in nature. The use of concepts such as SGSN or MS within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile equipment without a subscriber identity module, SIM, as well as mobile stations including one or more SIMs. Further, protocols and layers are referred to in close relation with GPRS, UMTS and Internet terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

We claim:

1. A method for base station handover of a mobile station (MS) from a source cell of a source base station to a target cell of a target base station in a cellular radio network, wherein the base stations transfer packet switched communications between the mobile station and the network, the method comprising:

by the source base station while the MS is in the source cell:
receiving a handover command message from a source support node,
stopping reception and acknowledgement of uplink packets from the MS;
stopping transmission of downlink packets towards the MS;
sending a context message to the source support node without indicating which buffered downlink packets have been discarded;
transmitting to the MS, the handover command message ordering the MS to connect to the target cell; and
transmitting to the MS, information regarding a sequence number of a next expected uplink packet that is expected by the source support node for a packet flow subject to lossless packet switched handover; and by the MS upon arrival and synchronization of the MS in the target cell:
transmitting to the target base station, information regarding a sequence number of a next expected downlink packet that is expected by the MS for the packet flow subject to lossless packet switched handover; and
starting uplink data transmission to the target base station beginning with the next expected uplink packet that is expected by the source support node.

2. The method according to claim 1, wherein the MS also receives a transfer of radio link control data blocks in an acknowledged mode.

3. The method according to claim 1, wherein the information transmitted by the MS to the target base station includes a sequence number of the next expected Protocol Data Unit (PDU) to be received by the MS.

4. The method according to claim 1, wherein the MS receives lower layer packet acknowledgements, and the step of starting uplink data transmission includes starting uplink data transmission in the target cell beginning with the next up-link packet that was not acknowledged by lower layers in the source cell.

5. A system for base station handover of a mobile station (MS) from a source cell of a source base station to a target cell of a target base station in a cellular telecommunication network, wherein the base stations transfer packet switched communications between the MS and the network, the system comprising:
   a first processor in the source base station configured to cause the source base station to perform the following functions while the MS is in the source cell:
      receive a handover command message from a source support node;
      stop reception and acknowledgement of uplink packets from the MS;
      stop transmission of downlink packets towards the MS;
      send a context message to the source support node without indicating which buffered downlink packets have been discarded;
      transmit to the MS, the handover command message ordering the MS to connect to the target cell; and
      transmit to the MS, information regarding a sequence number of a next expected uplink packet that is expected by the source support node for a packet flow subject to lossless packet switched handover; and
   a second processor in the MS configured to cause the MS to perform the following functions upon arrival and synchronization of the MS in the target cell:
      transmit to the target base station, information regarding a sequence number of a next expected downlink packet that is expected by the MS for the packet flow subject to lossless packet switched handover; and
      start uplink data transmission to the target base station beginning with the next expected uplink packet that is expected by the source support node.

6. The system according to claim 5, wherein the MS is configured to receive a transfer of radio link control data blocks in an acknowledged mode.

7. The system according to claim 5, wherein the information transmitted by the MS to the target base station includes a sequence number of the next expected Protocol Data Unit (PDU) to be received by the MS.

8. The system according to claim 5, wherein the MS is configured to receive lower layer packet acknowledgements, and the step of starting uplink data transmission includes starting uplink data transmission in the target cell beginning with the next up-link packet that was not acknowledged by lower layers in the source cell.

* * * * *